United States Patent
Giusti et al.

(10) Patent No.: US 11,326,912 B2
(45) Date of Patent: May 10, 2022

(54) POINTER DEVICE FOR AN INDICATOR INSTRUMENT, IN PARTICULAR FOR A VEHICLE

(71) Applicant: MAGNETI MARELLI S.p.A., Corbetta (IT)

(72) Inventors: Ruggero Giusti, Savignano s/R (IT); Sylvain Mouard, Magenta (IT); Luca Carlone, Campobasso (IT)

(73) Assignee: Marelli Europe S.p.A., Corbetta (IT)

( * ) Notice: Subject to any disclaimer, the term of this patent is extended or adjusted under 35 U.S.C. 154(b) by 520 days.

(21) Appl. No.: 16/375,324

(22) Filed: Apr. 4, 2019

(65) Prior Publication Data
US 2019/0310114 A1    Oct. 10, 2019

(30) Foreign Application Priority Data

Apr. 6, 2018   (IT) .................. 102018000004284

(51) Int. Cl.
*G01D 13/26*   (2006.01)
*B60K 37/02*   (2006.01)
*B60K 35/00*   (2006.01)

(52) U.S. Cl.
CPC .......... *G01D 13/265* (2013.01); *B60K 35/00* (2013.01); *B60K 37/02* (2013.01);
(Continued)

(58) Field of Classification Search
CPC ...... G01D 13/265; G01D 13/28; B60K 35/00; B60K 37/02; B60K 2370/698;
(Continued)

(56) References Cited

U.S. PATENT DOCUMENTS 2,328,485 A * 8/1943 Ott .................. G01D 13/28
                                                 116/62.3
4,625,262 A * 11/1986 Sakakibara ............ G01R 1/08
                                                 362/23.15
(Continued)

FOREIGN PATENT DOCUMENTS

EP   0967465 A2   12/1999
EP   0984249 A1   3/2000
(Continued)

OTHER PUBLICATIONS

Search Report for Italian Patent Application No. 201800004284 dated Oct. 12, 2018.

*Primary Examiner* — Yaritza Guadalupe-McCall
*Assistant Examiner* — Tania Courson
(74) *Attorney, Agent, or Firm* — Howard & Howard Attorneys PLLC

(57) ABSTRACT

A pointer device for an indicator instrument, in particular for a vehicle, is provided with a light-guide body defined by a single piece, which, in use, receives light from a light source and has a hub and a pointer radially protruding from the hub; the hub has a surface covered by a shield and a light transmission portion, which, on the opposite side, ends with at least one light emission area; the device is provided with a cap defined by a single piece, which is separate from said light-guide body and has an intermediate portion and a lateral portion arranged in an inner and outer radial position, respectively, relative to the light transmission portion; the cap has at least one through opening aligned with the light emission area and connection portions extending radially and joining the intermediate portion to the lateral portion.

11 Claims, 6 Drawing Sheets

(52) U.S. Cl.
CPC .... *B60K 2370/20* (2019.05); *B60K 2370/336* (2019.05); *B60K 2370/693* (2019.05); *B60K 2370/698* (2019.05); *B60K 2370/6992* (2019.05)

(58) Field of Classification Search
CPC .......... B60K 2370/693; B60K 2370/20; B60K 2370/6992; B60K 2370/336
See application file for complete search history.

(56) References Cited

U.S. PATENT DOCUMENTS

| | | | | |
|---|---|---|---|---|
| 4,860,170 A * | 8/1989 | Sakakibara | ............ | G01D 11/28 362/23.15 |
| 5,458,082 A * | 10/1995 | Cookingham | ......... | G01D 11/28 116/288 |
| 6,161,934 A * | 12/2000 | Griffin | .................. | G01D 11/28 362/23.18 |
| 6,182,601 B1 * | 2/2001 | Baatz | .................... | G01D 11/28 116/288 |
| 6,338,561 B1 * | 1/2002 | Ikarashi | ................ | G01D 13/28 362/23.2 |
| 7,475,999 B2 * | 1/2009 | Mezouari | ............... | G01D 11/28 362/23.16 |
| 7,635,192 B2 * | 12/2009 | Takatsuka | .............. | B60K 37/02 362/23.13 |
| 7,665,413 B2 * | 2/2010 | Birman | .................. | G01D 11/28 116/288 |
| 9,404,772 B2 * | 8/2016 | Sherman | .............. | G01D 13/265 |
| 9,909,906 B2 * | 3/2018 | Horvath | ................ | G01D 13/04 |
| 9,958,474 B2 * | 5/2018 | Bi | ........................... | G01P 21/02 |
| 9,995,606 B2 * | 6/2018 | Miyazawa | ................ | F21V 7/00 |
| 10,054,470 B2 * | 8/2018 | Harkins | ................. | G01D 13/04 |
| 10,584,985 B2 * | 3/2020 | Mouard | ................. | G01D 11/28 |
| 10,717,385 B2 * | 7/2020 | Olilla | ..................... | B60K 35/00 |
| 10,782,162 B1 * | 9/2020 | Gertlar | ..................... | B60Q 3/62 |
| 10,859,414 B2 * | 12/2020 | Xu | ......................... | G01D 11/28 |
| 2005/0162843 A1 * | 7/2005 | Lee | ....................... | G01D 13/265 362/23.2 |
| 2008/0264328 A1 * | 10/2008 | Birman | .................. | G01D 11/28 116/288 |
| 2015/0138751 A1 * | 5/2015 | Sherman | .............. | G01D 13/265 362/23.21 |
| 2019/0323868 A1 * | 10/2019 | Xu | ......................... | G12B 11/04 |

FOREIGN PATENT DOCUMENTS

| | | | | |
|---|---|---|---|---|
| EP | 2876417 | B1 | 11/2016 | |
| EP | 3187834 | A1 | 7/2017 | |
| EP | 3549807 | A1 * | 10/2019 | ............ B60K 35/00 |
| JP | 11051717 | A * | 2/1999 | |
| JP | 2001281010 | A * | 10/2001 | |
| JP | 2002257604 | A * | 9/2002 | |
| JP | 5561211 | B2 | 7/2014 | |
| WO | 2017001550 | A1 | 1/2017 | |

* cited by examiner

POINTER DEVICE FOR AN INDICATOR INSTRUMENT, IN PARTICULAR FOR A VEHICLE

CROSS-REFERENCE TO RELATED APPLICATIONS

This Patent application claims priority from Italian Patent Application No. 102018000004284 filed on Apr. 6, 2018, the entire disclosure of which is incorporated herein by reference.

TECHNICAL FIELD

The invention relates to a pointer device for an indicator instrument, in particular for a vehicle.

BACKGROUND ART

As it is known, automotive dashboards are provided with indicator instruments to give numerical items of information to the driver, for example items of information concerning the speed of the vehicle and the revolutions per minute of the thermal engine. These instruments are generally provided with a dial having a series of marks and/or numbers and with a rotary pointer device having a body made of a light-guide material. This body comprises a hub, which is hinged about an axis so as to rotate due to the action of a motor, and a pointer, which radially protrudes from the hub so as to indicate the mark or the number corresponding to the item of information to be given to the driver. The front face of the pointer is luminous, at least under night driving conditions, thanks to one or more light sources arranged close to the hub under the dial.

When dealing with these solutions, patent EP0967465 discloses a cap fitted on the hub and a shield, which covers the hub at the bottom so as to avoid the formation of light halos on the dial. The cap is entirely opaque, so that it completely prevents light from spreading towards the driver in the area of the hub of the light-guide body.

In EP0984249, the cap is overmoulded on the hub, so as to form one single piece with the latter, and has a protuberance, which engages a recess obtained in the light-guide material of the hub. In this case, again, the cap prevents light from spreading towards the driver in the area of the hub of the light-guide body.

EP3187834 relates to two different solutions, wherein the cap lets the light flow towards the driver, namely defines a lightable area which, in particular, has a circular shape. In one of these solutions, the cap consists of two distinct and separate pieces defining the outer perimeter and the inner perimeter, respectively, of the lightable source. This solution is scarcely satisfying, as the number of components of the pointer device is larger. In the other solution, the cap is manufactured through moulding of a transparent body, to which an opaque coating is applied in the parts that are supposed to prevent light from being transmitted, namely on the entire cap, except for the aforesaid lightable area with a circular shape. This solution is scarcely satisfying as well, since it requires additional operations during the manufacturing process in order to coat the cap with an opaque material.

DISCLOSURE OF INVENTION

The object of the invention is to provide a pointer device for an indicator instrument, in particular for a vehicle, which is capable of solving the above-mentioned drawbacks in a simple and economic manner, and in particular which allows an area defined by the cap to become luminous through a limited number of components, with no need for additional processing after the moulding, with a luminosity that is as uniform as possible and without disturbances, and/or which can preferably be mounted in a simple manner and minimizing assembling mistakes.

According to the invention, there is provided a pointer device for an indicator instrument, in particular for a vehicle, as defined in claim 1.

BRIEF DESCRIPTION OF THE DRAWINGS

The invention will now be described with reference to the accompanying drawings, which show a non-limiting embodiment thereof, wherein.

BEST MODE FOR CARRYING OUT THE INVENTION

Figure 1:
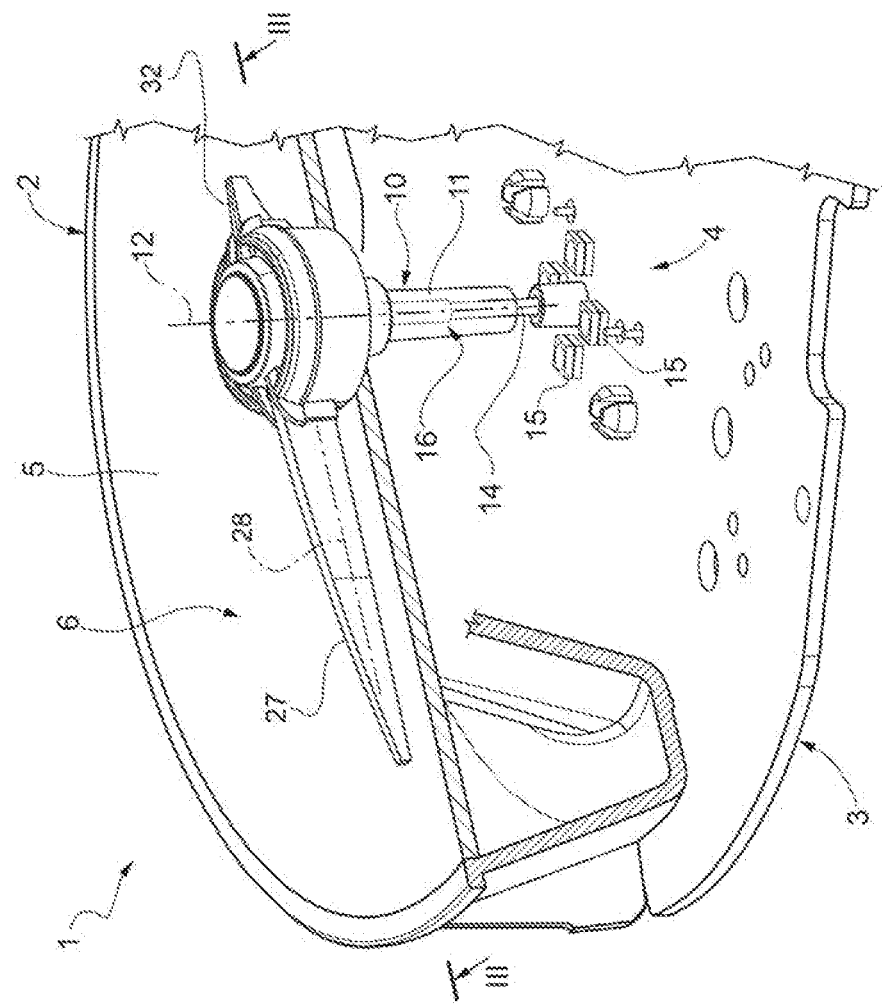
FIG. 1 is a perspective, with parts removed for greater clarity, of an indicator instrument, in particular for a vehicle, provided with a preferred embodiment of the pointer device according to the invention.

In FIG. 1, reference number 1 indicates a pointer device which is part of an indicator instrument 2 (which is partially shown), in particular for a vehicle (which is not shown).

The indicator instrument 2 comprises a fixed structure 3, which is part of a dashboard of the vehicle, has an inner cavity 4 and comprises a dial 5 having a front face 6 facing away from the cavity 4, namely facing outwards relative to the instrument 2 and, hence, facing the driver of the vehicle. The face 6 has a plurality of marks and/or numbers (which are not shown) to allow the device 1 to give a numerical item of information concerning the operation of the vehicle.

The device 1 comprises a body 10, which is defined by a single piece made of a known light-guide material. The body 10 comprises a shaft 11, which has an axis 12, extends in the cavity 4, axially extends through the dial 5 and can rotate about the axis 12 under the operation of an actuator (which is not shown). In particular, this actuator is defined by an electric motor arranged behind the structure and operates a rotary shaft 14, which extends in the cavity 4 and is coaxial and fixed relative to the shaft 11.

The cavity 4 houses at least one light source 15, for example a LED, which directly faces a free external surface 16 of the shaft 11, so that the light emitted by the source 15, through the surface 16, gets into the light-guide material and is transmitted by the latter in the entire body 10.

Figure 3:
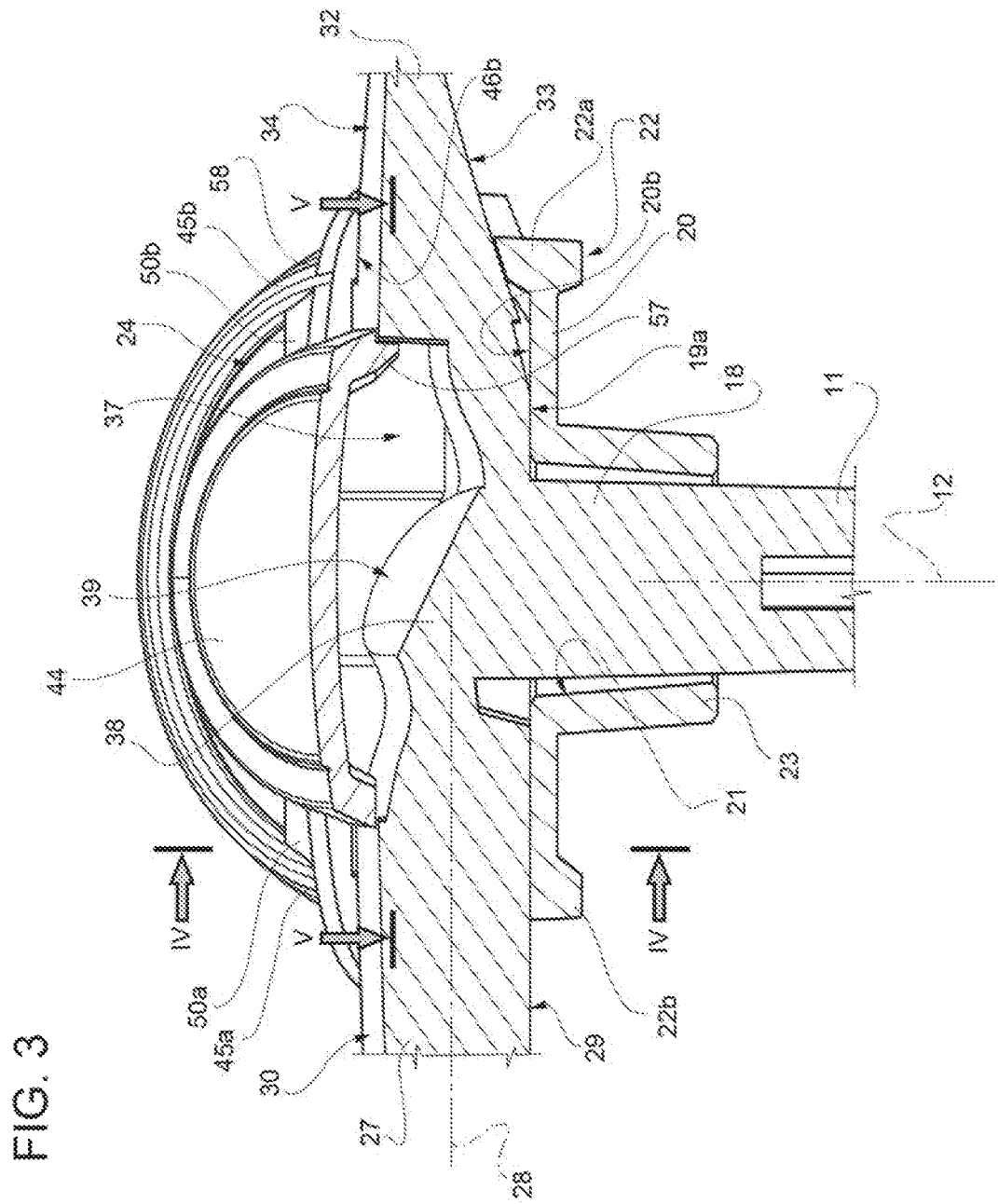
FIG. 3 is a perspective of the pointer device, which is shown on a larger scale and in a cross-sectional view along a section plane indicated by line III-III of FIG. 1.

With reference to FIG. 3, the body 10 further comprises a hub 17, which is coaxial to the shaft 11 and is arranged in the area of an axial end 18 of the shaft 11 and on the outside of the cavity 4. The hub 17 comprises a base plate 19, from which the shaft 11 axially protrudes. The base plate 19 has an outer perimeter with a preferably circular shape and is axially delimited by a rear surface 19a, which faces the face 6 and the shaft 11 and is at least partially covered by a shield 20, which is made of a material that is capable of blocking the passage of light. This material can be an absorbing material or a reflecting material from an optical point of view. In this case, the shield 20 prevents the light emitted by the surface 19a from reaching the face 6 and, hence, from forming light halos on the face 6.

Figure 2A:
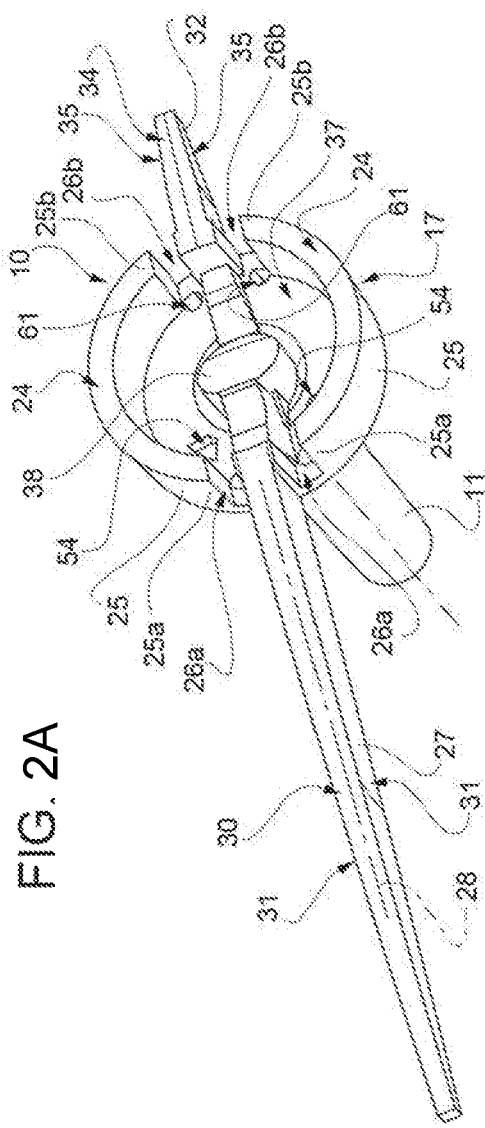
FIGS. 2A, 2B and 2C respectively show, in perspective, the components of the pointer device of FIG. 1.
Figure 2C:
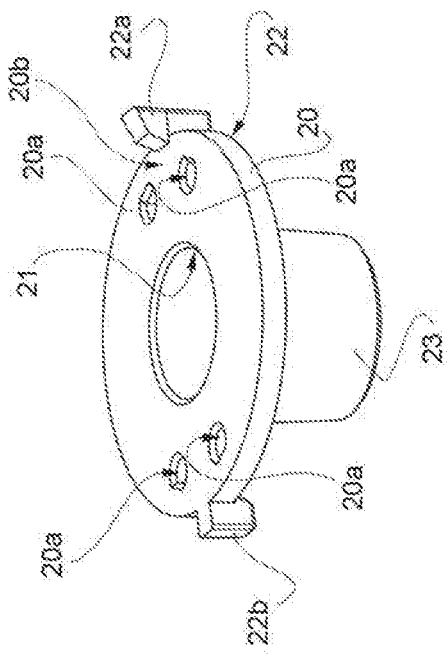

In the example shown herein, which is visible in FIG. 2C, the shield 20 is defined by a plate with an annular shape, which overlaps the surface 19a, is coaxial to the hub 17 and has a through hole 21, which is engaged by the end 18. More in detail, the plate is part of a piece 22 which is separate from the body 10 and is directly or indirectly fixed to the hub 17.

Hereinafter you can find a description of a preferred fixing mode, which involves the use of a plurality of holes 20a made through the shield 20, parallel to the axis 12.

In particular, the piece 22 further comprises a collar 23, which protrudes from an inner annular edge of the shield 20 and is fitted around the end 18 so as to prevent the light emitted by the end 18 from reaching the face 6 and, hence, from forming light halos.

Furthermore, the piece 22 preferably comprises a tooth 22a, which is arranged along an outer annular edge of the shield 20 and protrudes from a face 20b of the shield 20 parallel to the axis 12 and in an opposite direction relative to the collar 23. More preferably, the piece 22 comprises a tooth 22b, which is diametrically opposite the tooth 22a and radially protrudes from the outer annular edge of the shield 20, without axially protruding from the face 20b.

With reference to FIG. 2A, the body 10 further comprises a pointer 27, which protrudes outwards relative to the hub 17 along a radial axis 28 and is defined by a rear face 29 (FIG. 3), which faces the face 6, by a front face 30 opposite the face 29, and by two lateral faces 31 opposite one another. In particular, according to FIG. 3, the face 29 extends so as to prolong the surface 19a and rests on the surface 20b and on the tooth 22b.

The body 10 preferably comprises a tail 32, which protrudes from the hub 17 along the axis 28 in an opposite direction relative to the pointer 27 and is defined by a rear face 33 facing the shield 20 and the face 6, by a front face 34 opposite the face 33, and by two lateral faces 35 opposite one another (FIG. 2A).

The faces 29 and/or 33 are preferably treated, processed or covered, for example with a reflecting material coating, in order to better convey the light in the pointer 27 and in the tail 32, so as to avoid a dispersion of light towards the dial 5. If necessary, the faces 30 and/or 34 and/or the areas 24 can be treated, processed and/or covered with a coating, so as to generate particular optical effects, for example so as to generate a particular colour.

The face 33 advantageously rests on the tooth 22a and, in the area of the coupling, it has a shape that is complementary to the one of the tooth 22a; for example, the face 33 is inclined relative to the surface 20b. Thanks to this complementary shape, the tooth 22b is coupled to the tail 32, but it cannot be correctly coupled to the face 29 of the pointer 27, so that, during the assembling phases, it allows operators to find out whether the piece 22 was mounted with the correct orientation relative to the hub 17 or whether it was mounted with a wrong orientation, rotated by 180° about the axis 12.

With reference to FIG. 2A, on the opposite axial side relative to the surface 19a, the hub 17 has at least one light emission surface, which is transverse to the axis 12 and, in particular, consists of two separate areas 24 which are diametrically opposite one another. More in detail, the areas 24 have the shape of an arc of a circle, with a centre coinciding with the axis 12. The areas 24, in use, emit a light which is visible from the outside of the device 1.

The hub 17 comprises a light transmission portion, which protrudes from the base plate 19 parallel to the axis 12, axially ends with the areas 24 and, specifically, is defined by two walls 25 arranged in diametrically opposite positions in the area of the outer perimeter of the base plate 19. Preferably, according to FIG. 4, in the area of the outer perimeter of the surface 19a, the hub 17 has two bevels 19b defining a reflection surface, usually called "prism", to direct the light in the walls 25 towards the areas 24. The walls 25 then guide the light from the bevels 19b up to the areas 24 without further reflections.

The walls 25 comprise respective end portions 25a, which face the faces 31 in a circumferential direction and are spaced apart from the faces 31 by respective gaps 26a. In a diametrically opposite direction, the walls 25 comprise respective end portions 25b, which face the faces 35 in a circumferential direction and are spaced apart from the faces 35 by respective gaps 26b.

As a consequence, the areas 24 are spaced apart from the face 30 and from the face 34.

With reference to FIG. 2A, again, the walls 25 and the base plate 19 delimit a cavity 37, which, in particular, has a substantially cylindrical shape. The hub 17 further comprises a light reflection portion 38, which is housed in the cavity 37 and axially protrudes from the base plate 19 in an opposite direction relative to the shaft 11, namely on the same side where the walls 25 protrude. According to FIG. 3, the portion 38 joins the pointer 27 to the tail 32 and is axially delimited by reflection surfaces 39, usually called "prisms", which are positioned and shaped so as to reflect the light coming from the shaft 11 towards the faces 30 and 34, which, therefore, become luminous in use. This lighting has the technical function of making the pointer 27 visible to the driver, in particular under night driving conditions, whereas the lighting of the tail 32 mainly has an aesthetic function.

Figure 2B:
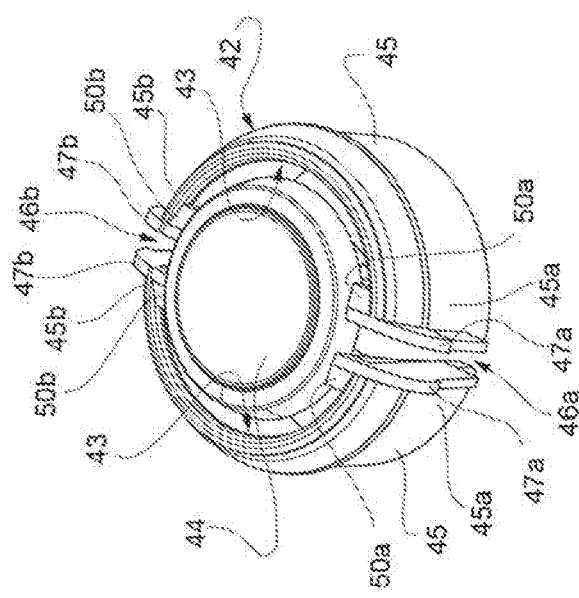
Figure 4:
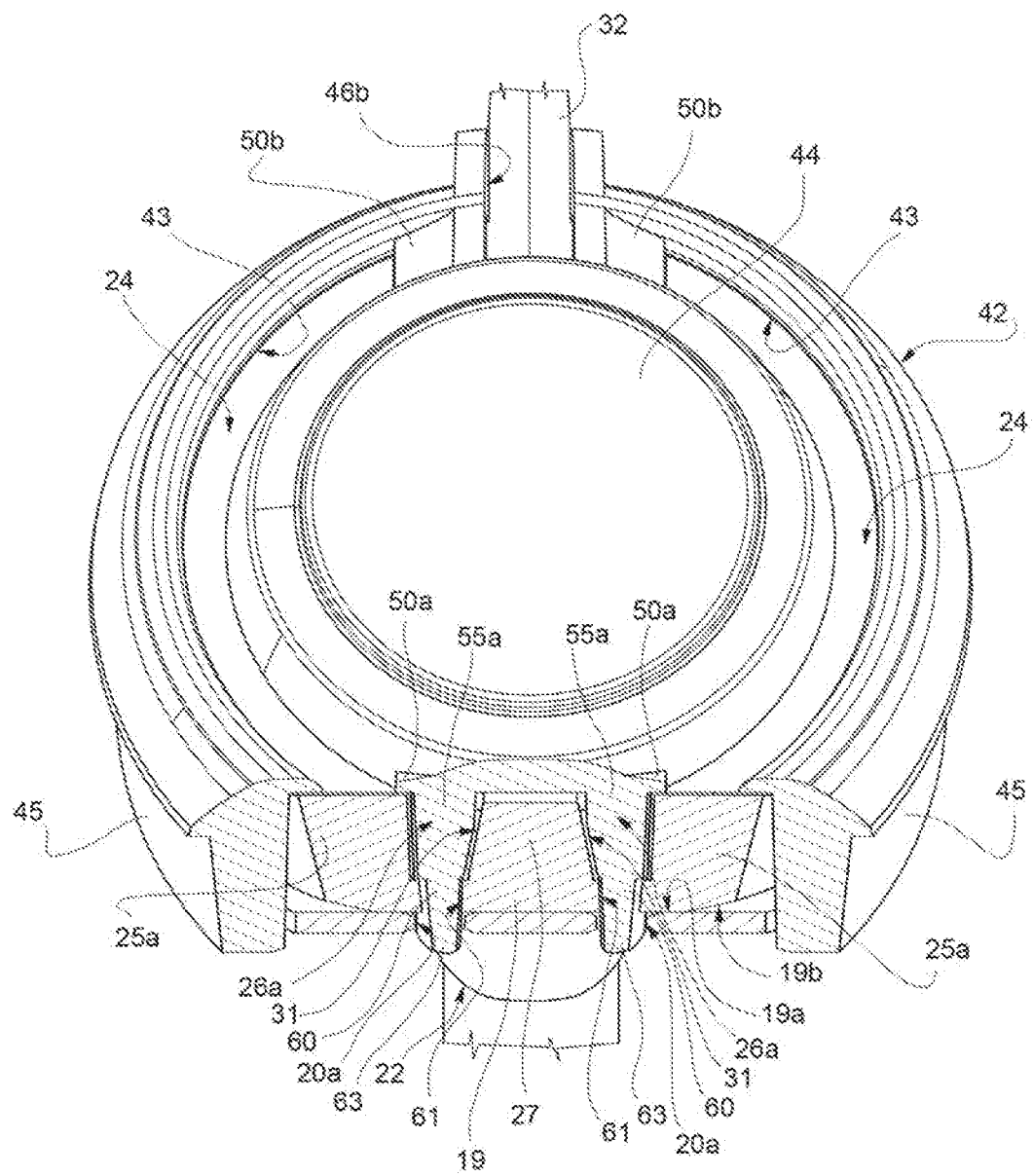
FIGS. 4 and 5 are different perspectives of the pointer device, which is shown in a cross-sectional view according to section planes indicated by lines IV-IV and V-V, respectively, of FIG. 3.
Figure 6:
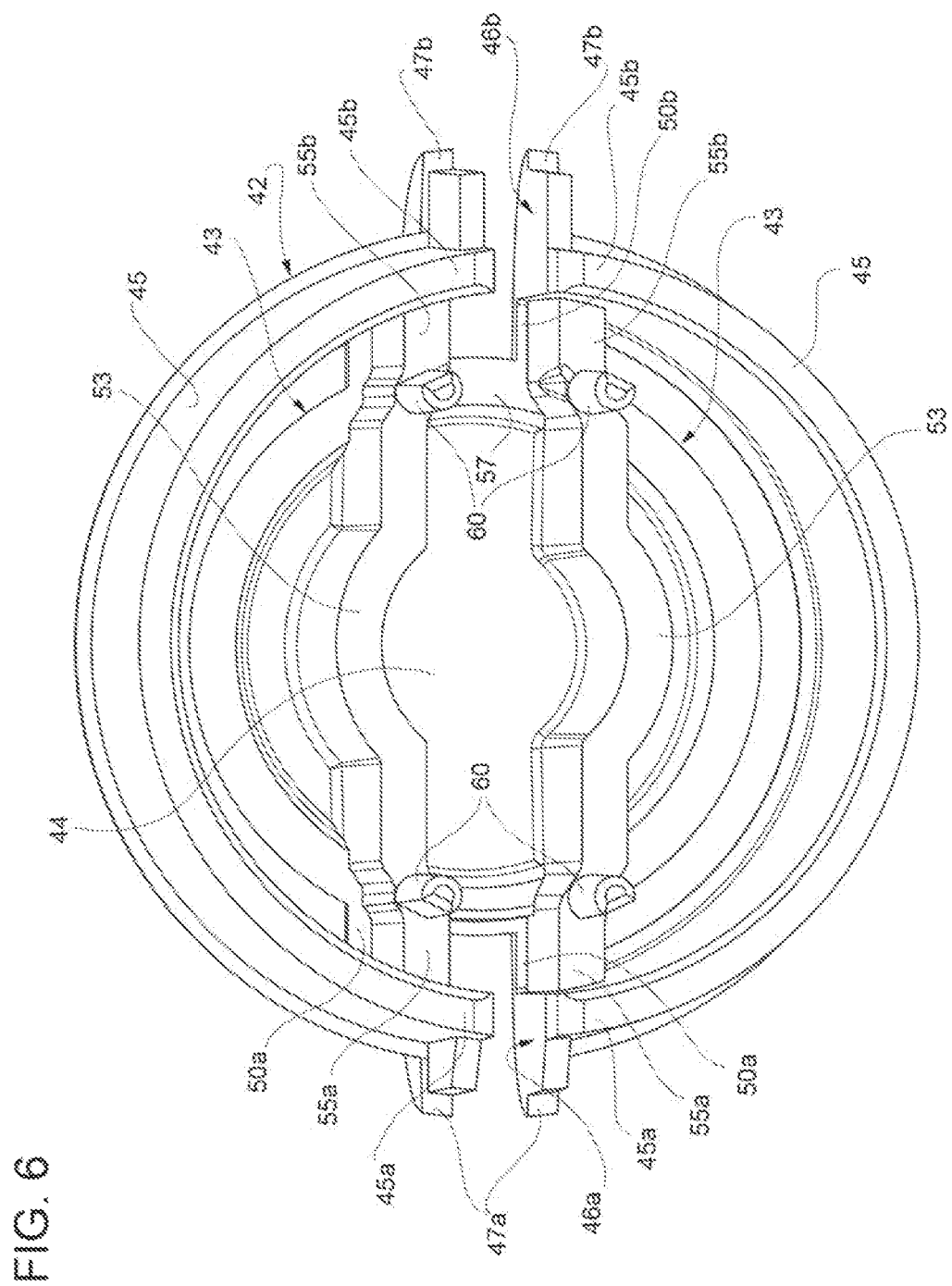
FIG. 6 shows the component of FIG. 2B in perspective from the bottom.

With reference to FIGS. 2B, 4 and 6, the device 1 further comprises one single cap 42, which is distinct from the body 10 and from the piece 22, is mounted on the hub 17 in a fixed position and is defined by a single piece, for example obtained through plastic material moulding.

The cap 42 prevents the light from being transmitted, but has two through openings 43, which are aligned with the areas 24 of the hub 17 in order to allow respective light flows to come out through the cap 42 and, hence, have the light emitted by the areas 24 be perceived on the outside, in addition to the light emitted by the pointer 27 and by the tail 32. In particular, the through openings 43 substantially have the same shape as the areas 24; the light emitted through the through openings 43 mainly fulfils an aesthetic function.

The cap 42 preferably consists of a material capable of blocking light. According to a variant which is not shown herein, the cap 42 is made of a material covered by a coating capable of blocking light.

The cap 42 substantially has, on the outside, the shape of an upside-down cup. In particular, the cap 42 comprises an intermediate wall 44, which is transverse to the axis 12 and is arranged radially on the inside relative to the areas 24, and a lateral portion, which is arranged radially on the outside relative to the areas 24, surrounds the walls 25 and, specifically, consists of two lateral walls 45 diametrically opposite one another. The wall 44 closes the cavity 37, in a position opposite and axially facing the base plate 19, whereas the walls 45 end, in a circumferential direction, with respective ends 45a defining, between one another, a slit 46a, and with respective ends 45b diametrically opposite relative to the ends 45b and defining, between one another, a slit 46b. The slits 46a and 46b are aligned with one another and are passing through along the axis 28; the slit 46a is crossed by the pointer 27, whereas the slit 46b is crossed by the tail 32.

In particular, in the area of the slit 46a, the cap 42 comprises a pair of appendages 47a, which protrude from the ends 45a parallel to the axis 28 towards the outside, beside the faces 31, so as to prolong the radial extension of the slit 46a. Similarly, in the area of the slit 46b, the cap 42 comprises a pair of appendages 47b, which protrude from the ends 45b towards the outside parallel to the axis 28, beside the faces 35, so as to prolong the radial extension of the slit 46b.

According to an aspect of the invention, the cap 42 comprises connection portions 50a and 50b, which join an outer edge of the wall 44 to the ends 45a and 45b, respectively. In particular, two portions 50a are provided in the area of the gaps 26a, so as to cover them, and are spaced apart from one another in a circumferential direction, so as to leave an area of the face 30 uncovered and visible from the outside. Similarly, two portions 50 are provided in the area of the gaps 26a, so as to cover them, and are spaced apart from one another in a circumferential direction, so as to leave an area of the face 34 uncovered and visible from the outside.

Figure 5:
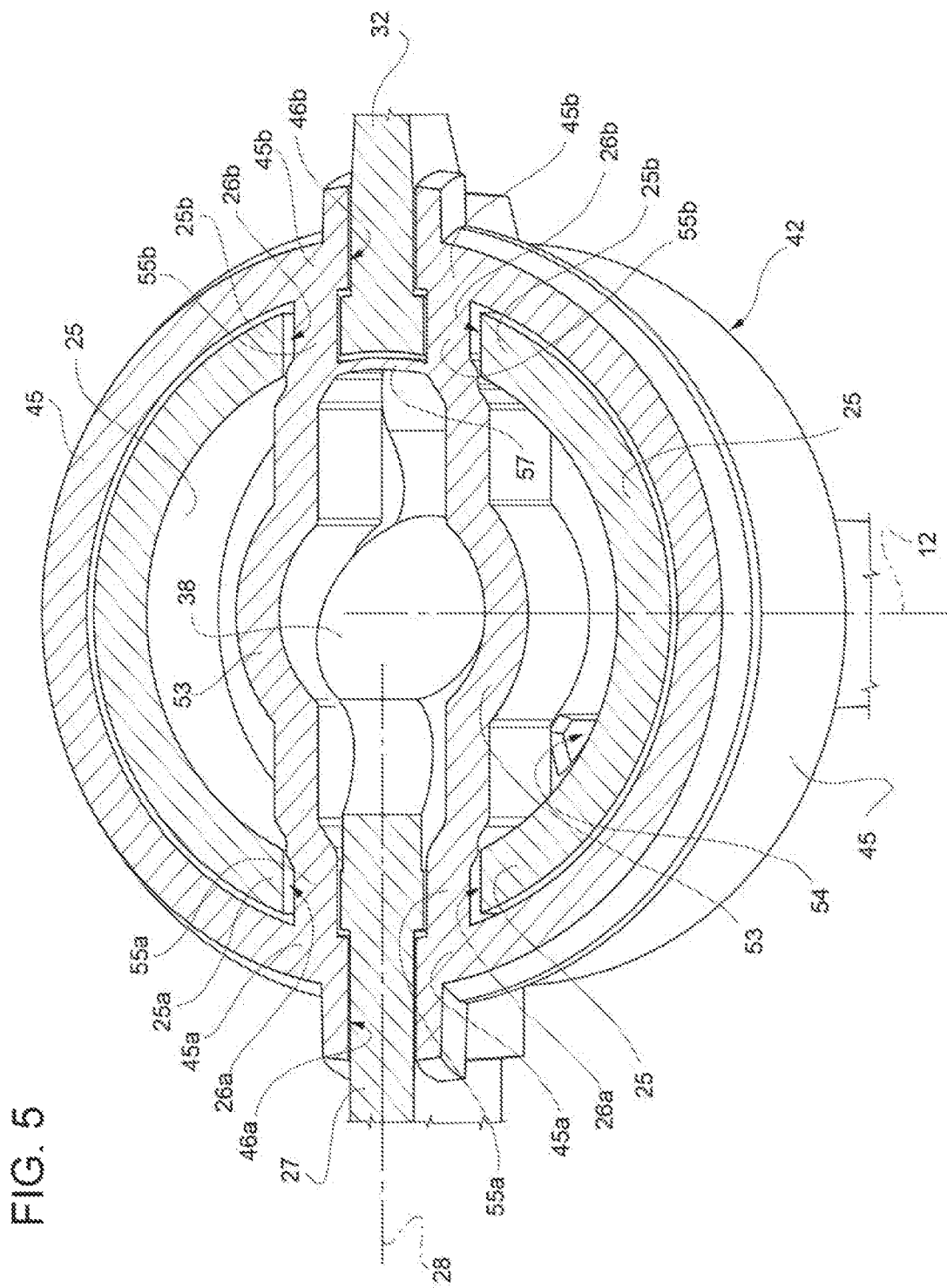

Therefore, the through openings 43 are radially delimited inwards by the wall 44, are radially delimited outwards by the walls 45 and are delimited in a circumferential direction by the portions 50a and 50b. With reference to FIGS. 5 and 6, the cap 42 further comprises two shielding walls 53, which protrude into the cavity 37, from the wall 44 towards the base plate 19, preferably in a direction parallel to the axis 12, so as to be radially interposed between the portion 38 and the walls 25, respectively. The walls 53 preferably have a height that is such as to allow them to rest against the base plate 19.

In this way, the light part coming out of the portion in the cavity 37 does not reach the areas 24, thus limiting interferences and/or luminosity alterations of the areas 24. In other words, the quantity of light reaching the areas 24 is basically determined by the optical features of the base plate 19 and of the bevel 19b, regardless of the optical features of the portion 38.

As far as the optical features of the base plate 19 are concerned, the latter is preferably provided with recesses 54 (FIGS. 2A and 5), which alter the passage of light towards the walls 25 and have positions and/or dimensions and/or shapes that are such as to cause the light emitted by the areas 24 to be uniform.

According to FIG. 6, the walls 53 are joined to the ends 45a by means of respective connection and shielding walls 55a and to the ends 45b by means of respective connection and shielding walls 55b. The walls 55a and 55b are parallel to the axis 28; in particular, they extend as prolongation of the walls 53 and are substantially aligned with the appendages 47a and 47b, respectively, parallel to the axis 28. The walls 55a and 55b protrude from the portions 50a and 50b, respectively, preferably up to the base plate 19, so as to engage the gaps 26a and 26b, respectively, on opposite sides of the pointer 27 and of the tail 32, respectively.

According to a variant which is not shown herein, the tail 32 is absent, so that the gaps 26b and the slits 46b can also be absent. In other words, without the tail 32, the walls 45 can also be replaced by a single lateral wall, which is continuous in a circumferential direction in the area of the ends 45b, and/or the walls 25 can be replaced by a single wall, which is continuous in a circumferential direction in the area of the ends 25b, without the joining walls 55b and, if necessary, the portions 50b.

With reference to FIG. 3, the cap 42 comprises a tooth 57, which protrudes from the wall 44 towards the base plate 19 so as to engage a seat 58 defined by the portion 38 and by the tail 32. In a diametrically opposite position, the portion 38 has no similar seat, so that the tooth 57 interferes with the portion 38 and/or with the pointer 27 if the cap 42 is mounted on the hub 17 with a wrong orientation, rotated by 180° about the axis 12. In other words, if the cap 42 were mounted with a wrong orientation during the assembly of the device 1, the cap 42 would remain inclined relative to the axis 12, due to the interference, so as to point out the wrong assembly.

Advantageously, the cap 42 is not directly fixed to the hub 17, but it is fixed to the piece 22 so as to axially hold the hub 17 between the shield 20 and the walls 53. In particular, with reference to FIGS. 4 and 6, the cap 47 comprises a plurality of pins 60, which pass through respective through holes 61 made in the base plate 19 and are fixed to the shield 20. For example, the pins 60 engage the holes 20a of the shield 20 and have respective ends 63, which are arranged under the shield 20 and are staked or enlarged so as to define a stop abutment for said shield 20.

The pins 60 preferably protrude from the walls 53 and/or from the walls 55a, 55b.

With reference to FIG. 2A, the holes 61 are preferably made close to the gaps 26a and 26b, so as not to interfere with the light transmitted through the base plate 19a towards the walls 25 in a radial direction relative to the axis 12.

Other mechanical fixing means can be provided to couple the cap 42 to the body 10. The mechanical fixing means do not include overmoulding techniques, which should be avoided in order to prevent the material of the cap 42 from becoming integral to the light-guide material of the body 10, thus generating absorptions and/or interferences in the transmission and reflection of the light in the body 10. As an alternative to or in combination with the fixing systems discussed herein, the piece 22 can be coupled to said teeth carried by the portions 45; and/or the cap 42 can be thermally welded to the piece 22; and/or the cap 42 can directly be fixed to the hub 17, for example through the pins 60.

As a further variant, which is not shown herein, the shield 20 is defined by a coating applied on the face 19a and, if necessary, also on the end 18 of the shaft 11. In particular, said coating is defined by a reflecting material so as to better convey the light in the base plate 19 and avoid the dispersion of light towards the dial 5. For example, is coating is applied by means of hot printing or through screen printing.

Owing to the above, the advantages of the device 1 are evident.

First of all, the portions 50a and 50b and the walls 55a and 55b allow the cap 42 to be manufactured as one single piece, as mentioned above, since they connect the wall 44 to the walls 45, so that the number of components of the device 1 is extremely limited. In turn, the limited number of components allows manufacturers to obtain an advantageous solution in terms of manufacturing times and costs and in terms of easiness of assembly.

At the same time, the cap 42 lets the light flow outwards through the through openings 43 without filtering the light and with no need to carry out, on the cap 42, covering or coating operating phases taking place after the manufacturing phased (namely, after the moulding).

Furthermore, the walls 53, 55a and 55b act like a shield so as to separate the different elements of the hub 17 from one another in an optical manner and make them independent of one another. Indeed, the different parts of the cap 42 clearly separate from one another the four components of the body 10 which are supposed to emit light, namely the pointer 27, the tail 32 and the two walls 25. In other words, thanks to the configuration of the hub 17 and of the cap 42, the light is emitted along flows (one towards the pointer 27 and the tail 32, the other one towards the walls 25) which are substantially independent of one another inside the body 10.

Other advantages are then evident for a person skilled in the art based on the features described above.

Finally, it is evident that the device 1 described with reference to the accompanying drawings can be subjected to changes and variations, which do not go beyond the scope of protection of the invention, as set forth in the appended claims.

In particular, the position, the width and the shape of the through openings 43 and of the areas 24 could be different from the ones disclosed above by way of example; and/or the portions 50a and 50b could cover the faces 30 and 34.

Finally, the device 1 could be used in applications different from the automotive one.

The invention claimed is:

1. A pointer device for an indicator instrument, in particular for a vehicle; the device comprising:
   a light-guide body, that is defined by a single piece, is made with light-guide material, has a rotation axis and comprises:
      a) an external surface adapted to receive light from a light source;
      b) a hub comprising a base surface and a light transmission portion, which axially ends with at least one light emission area, at the opposite axial side in respect to said base surface;
      c) a pointer, which radially protrudes outwards from said hub;
   a shield, that covers said base surface at least partially so as to block the light transmitted from said hub;
   a cap, that is defined by a single piece separated from said light-guide body, is mounted on said hub in a fixed position, and comprises:
      d) an intermediate portion radially arranged inwards in respect to said light transmission portion; and
      e) a lateral portion that surrounds said light transmission portion;
   said cap further comprising:
   at least one through opening radially arranged between said intermediate portion and said lateral portion and aligned with said light emission area for allowing the light to exit through said cap;
   a pair of connection portions disposed spaced from one another extending radially and joining said intermediate portion to said lateral portion;
   wherein said light transmission portion comprises a pair of first end portions which are spaced apart from said pointer, in a circumferential direction, by first gaps disposed opposite to one another; said pair of connection portions engaging, respectively, said first gaps.

2. The device according to claim 1, wherein said light-guide body further comprises a tail that protrudes from said hub in a radial direction opposite to said pointer; said light transmission portion comprising a pair of fourth end portions that are separated from said tail, in a circumferential direction, by second gaps disposed opposite to one another; said cap comprising a further pair of connection portions engaging, respectively, said second gaps.

3. The device according to claim 1, wherein said at least one through opening is radially delimited inwards by said intermediate portion and radially delimited outwards by said lateral portion; said pair of connection portions defining said at least one through opening in a circumferential direction.

4. The device according to claim 3, wherein said lateral portion comprises a pair of second end portions defining between each other, in a circumferential direction, a first slit radially crossed by said pointer; said pair of connection portions joining said intermediate portion to said second end portions.

5. The device according to claim 4, wherein said light-guide body further comprises a tail, that protrudes from said hub in an opposite radial direction to said pointer; said lateral portion comprises a pair of third end portions defining between each other, in a circumferential direction, a second slit radially crossed by said tail; said pair of connection portions joining said intermediate portion to said third end portions.

6. The device according to claim 1, wherein said hub comprises:
   a cavity radially delimited by said light transmission portion;
   a reflection portion that engages said cavity and is shaped in order to reflect light towards said pointer;
   said cap comprising shielding walls arranged in said cavity so as to be radially interposed between said reflection portion and said light transmission portion.

7. The device according to claim 6, wherein said light-guide body further comprises a tail that protrudes from said hub in an opposite radial direction to said pointer; said cap comprising a tooth, which protrudes into said cavity in order to engage a seat defined by said reflection portion and by said tail.

8. The device according to claim 6, wherein said cap is fixed so as to axially hold said hub between said shield and said shielding walls.

9. The device according to claim 1, wherein said cap comprises a plurality of pins, which pass through respective first holes made through said base surface and are fixed to said shield.

10. The device according to claim 9, wherein said pins engage respective second holes made through said shield and have respective ends which are arranged under said shield and are staked or enlarged so as to define a stop abutment for said shield.

11. The device according to claim 9, wherein said pins protrude from said pair of connection portions.

* * * * *